United States Patent
Sambhwani et al.

(10) Patent No.: US 7,139,256 B2
(45) Date of Patent: Nov. 21, 2006

(54) METHOD AND SYSTEM FOR DETECTING AND IDENTIFYING SCRAMBLING CODES

(75) Inventors: Sharad Sambhwani, San Diego, CA (US); Ghobad Heidari, San Diego, CA (US)

(73) Assignee: Quicksilver Technology, Inc., Palo Alto, CA (US)

( * ) Notice: Subject to any disclaimer, the term of this patent is extended or adjusted under 35 U.S.C. 154(b) by 885 days.

(21) Appl. No.: 10/015,537

(22) Filed: Dec. 12, 2001

(65) Prior Publication Data

US 2003/0227884 A1 Dec. 11, 2003

(51) Int. Cl.
*H04B 7/216* (2006.01)
*H04B 1/69* (2006.01)

(52) U.S. Cl. ............. 370/335; 370/342; 375/137; 375/142

(58) Field of Classification Search ............. None
See application file for complete search history.

(56) References Cited

U.S. PATENT DOCUMENTS

| | | | |
|---|---|---|---|
| 6,894,996 B1* | 5/2005 | Lee | 370/337 |
| 2002/0024942 A1* | 2/2002 | Tsuneki et al. | 370/335 |
| 2002/0041581 A1* | 4/2002 | Aramaki | 370/335 |
| 2003/0012270 A1* | 1/2003 | Zhou et al. | 375/150 |
| 2003/0063656 A1* | 4/2003 | Rao et al. | 375/142 |

* cited by examiner

*Primary Examiner*—Chau Nguyen
*Assistant Examiner*—Rhonda Murphy
(74) *Attorney, Agent, or Firm*—Townsend and Townsend and Crew

(57) ABSTRACT

A system for detecting and identifying the identity of a base station or cell which transmits a scrambling code is provided. According to one aspect of the system, the system is used to perform scrambling code detection of eight (8) primary cells (each scrambling code being spaced sixteen (16) chips apart) in a group. According to another aspect of the system, a single scrambling code generator is used to generate a master scrambling code. The master scrambling code is then used to create individual scrambling codes which are used in correlation with received signals to detect in parallel which one of the eight (8) possible primary cells in the group transmitted the received signals.

24 Claims, 4 Drawing Sheets

METHOD AND SYSTEM FOR DETECTING AND IDENTIFYING SCRAMBLING CODES

CROSS-REFERENCES TO RELATED APPLICATION(S)

The present application is related to U.S. patent application Ser. No. (to be assigned) entitled "A METHOD AND SYSTEM FOR IMPLEMENTING DETECTION AND IDENTIFICATION OF SCRAMBLING CODES," by Sharad Sambhwani et al., commonly owned and filed concurrently herewith, the disclosure of which is hereby incorporated by reference in their entirety as if set forth in full herein for all purposes.

BACKGROUND OF THE INVENTION

The present invention generally relates to scrambling codes. More specifically, the present invention relates to a method and system for detecting scrambling codes within a W-CDMA communication system.

Code acquisition is a fundamental algorithm required in any direct sequence spread spectrum (DSSS) receiver. Prior to de-spreading, demodulating and decoding frames, such a receiver needs to acquire knowledge of timing information relating to the underlying spreading waveform being used to spread the data-bearing signal. According to the wide-band code division multiple access (W-CDMA) communication system of the 3GPP standards body, upon turning on a mobile terminal or device, a 3-step initial cell search procedure needs to be performed to acquire the primary scrambling code which is used to spread the data bearing channels. Examples of such channels are the primary common pilot channel (P-CPICH) and the dedicated physical channel (DPCH).

The first step of the 3-step initial cell search procedure relates to slot timing. In a W-CDMA communication system, each base station transmits its own scrambling code in frames over the air to a mobile terminal. Each frame is made up of fifteen (15) slots. Before the start of a frame can be located, the start of a slot needs to be identified first. Once the start of a slot is identified, then it can be assured that one of the next fifteen (15) slots represents the start of a frame. Upon conclusion of the first step, the start of a slot is identified.

The second step of the 3-step initial cell search procedure relates to frame timing. As mentioned above, at the end of the first step, the start of a slot is identified. Once that is achieved, the start of a frame can then be identified. Within a W-CDMA communication system, there are five hundred and twelve (512) base stations within the network. The base stations are identified in the network by a network matrix. The network matrix has sixty-four groups (64) and each group has eight (8) cells. A particular base station is identified by its group and its cell position within the group. During this second step, the start of a frame is identified and the mobile terminal can then synchronize to the identified frame and obtain information relating to group identification. Upon conclusion of the second step, the group which contains the base station that sent out the frame (or scrambling code) is identified, i.e., one out of sixty-four (64) group is identified.

Upon completing the first two steps of the initial cell search procedure, the receiver has knowledge of the slot and frame timing of the received scrambling code, such as a P-CPICH signal. The receiver also has knowledge of the group identification of the base station or cell being acquired. The group identification information contains information on all eight (8) primary cells within the group. Since there are eight (8) cells in a group, using the group identification information, the receiver needs only to identify one (1) out of eight (8) possible primary cells from the group.

To achieve this goal, the receiver may use one of two conventional approaches. Under the first approach, the receiver may perform a correlation of the received signals with a parallel bank of eight (8) scrambling code generators (typical correlation length N ranges from 64 to 256 chips based on frequency offset in the received signals). All the eight (8) correlations are performed within N chips, at the expense of using eight (8) parallel scrambling code generators.

Under the second approach, the receiver may sequentially correlate the received signals with eight (8) possible scrambling codes for N chips each. Using a single scrambling code generator, one may attain all eight (8) correlation results after slightly greater than 8*N chips (this number of chips is needed to allow for reassigning the scrambling code generator to another phase offset, after each correlation is performed), Implementations may not be limited to the above two conventional approaches. The above two approaches were explained for the case of real time processing of the CDMA signal, i.e. no buffering of received data was assumed for these two cases.

As mentioned above, the eight (8) scrambling codes may be generated in parallel, using eight (8) separate scrambling code generators each operating independently, or the eight (8) scrambling codes maybe generated using a single scrambling code generator using eight (8) sets of masks (a set=4 18-bit masks). However, both of these approaches require additional power consumption/silicon area. Under the first approach, additional scrambling code generators are needed; and under the second approach, additional memory storage is needed to store the received signals and it takes additional time to generate and process the necessary scrambling codes in a sequential manner.

Hence, it would be desirable to provide a method and system which is capable of generating scrambling codes for correlation to identify a received scrambling code in a more efficient manner.

SUMMARY OF THE INVENTION

An exemplary method of the present invention is used to perform scrambling code detection of eight (8) primary cells (each scrambling code being spaced sixteen (16) chips apart) in a group. According to the exemplary method, a single scrambling code generator is used to generate a master scrambling code. The master scrambling code is then used to create individual scrambling codes which are used in correlation with received signals to detect in parallel which one of the eight (8) possible primary cells in the group transmitted the received signals. The individual scrambling codes are created based on the fact that each cell's phase reference is spaced sixteen (16) chips apart. The use of this exemplary method reduced the complexity of scrambling code or PN generator(s) in the parallel search implementation.

The use of this exemplary method also avoids the need to utilize parallel logic to generate eight (8) scrambling codes. Since each primary scrambling code within a group is sixteen (16) chips apart, a buffer is used to store a sequential stream of scrambling code (i.e., the master scrambling code) output from a single scrambling code generator, and the received data is correlated in parallel with 16-chip offsets of portions of the master scrambling code. Eight dimensions are mapped to a single dimension at the expense of a slight increase in storage size.

This exemplary method can be used as part of an overall 3-step initial cell search procedure to acquire the downlink of a 3GPP WCDMA cell, which more specifically corresponds to part of the stage 3 portion of the cell search procedure.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
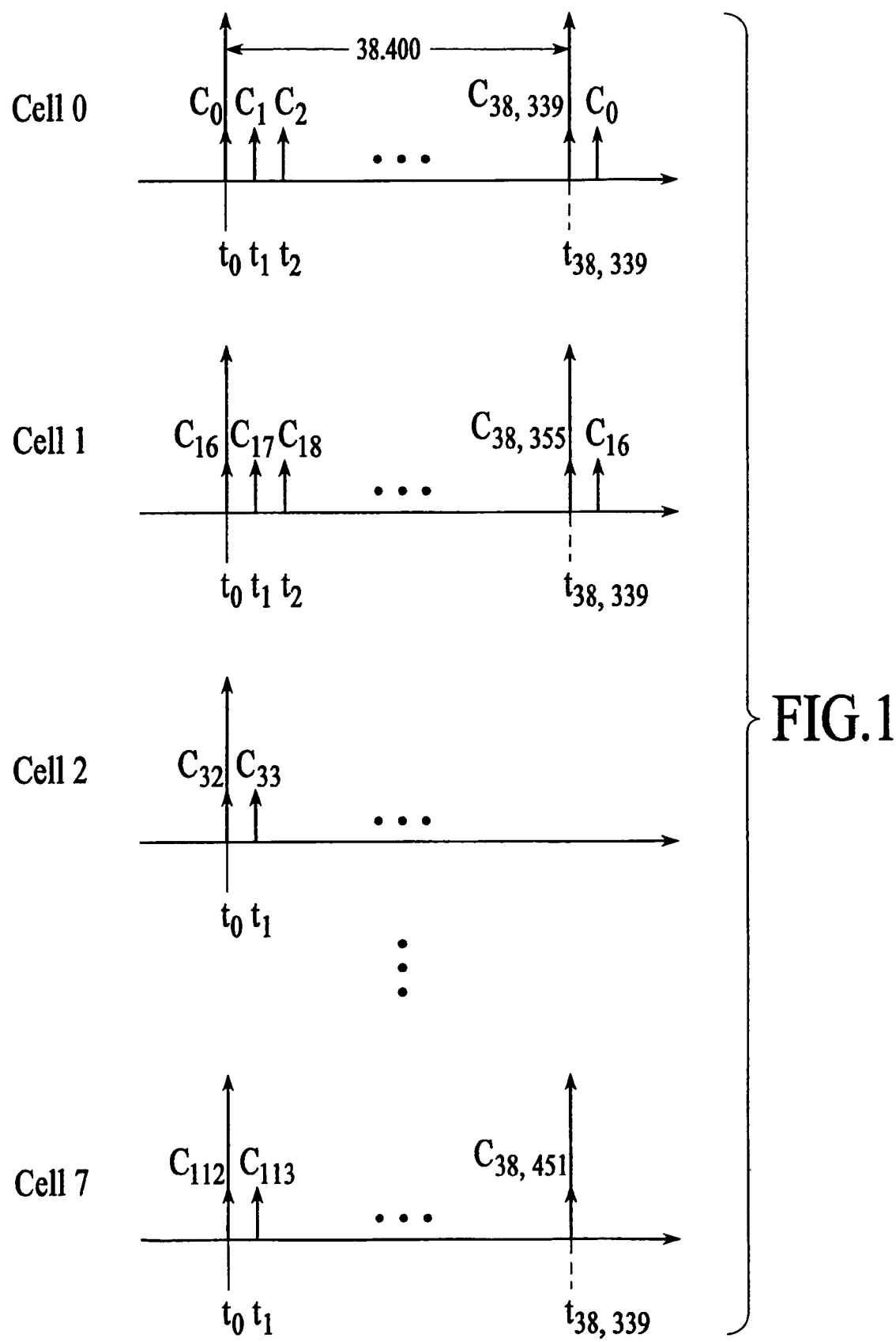
FIG. 1 is a simplified diagram illustrating the timing of the scrambling codes of the eight (8) cells within a group.

The present invention in the form of one or more exemplary embodiments will now be discussed. The present invention can be applied to the third step of the initial cell search procedure when a mobile terminal is initially powered on to identify the base station or cell which transmitted the received signals containing a scrambling code. FIG. 1 is a simplified diagram illustrating the timing of the scrambling codes of the eight (8) cells within a group. Referring to FIG. 1, the scrambling code of each cell is transmitted on a periodic basis and the period of the scrambling code of each cell is thirty-eight thousand and four hundred (38,400) chips, i.e., the scrambling code of each cell is repeated after 38,400 chips. For example, for cell "0", $C_0$ is transmitted at $t_0$ and at $t_{38,400}$. Furthermore, the scrambling codes of any two adjacent cells are offset by sixteen (16) chips. For example, cells "0" and "1" transmit $C_0$ and $C_{16}$ respectively at to. The scrambling codes of all the cells within the group are transmitted at the same frame boundary. By having a 16-chip offset between two adjacent cells, the scrambling codes between two adjacent groups of cells are offset by one hundred and twenty-eight (128) (16*8=128).

According to one exemplary method of the present invention, a scrambling code represented by the received signals is identified by using a single scrambling code generator to attain N chip correlation of the received signals with eight (8) primary scrambling codes in a group within N+16*7=N+112 chips.

Figure 2:
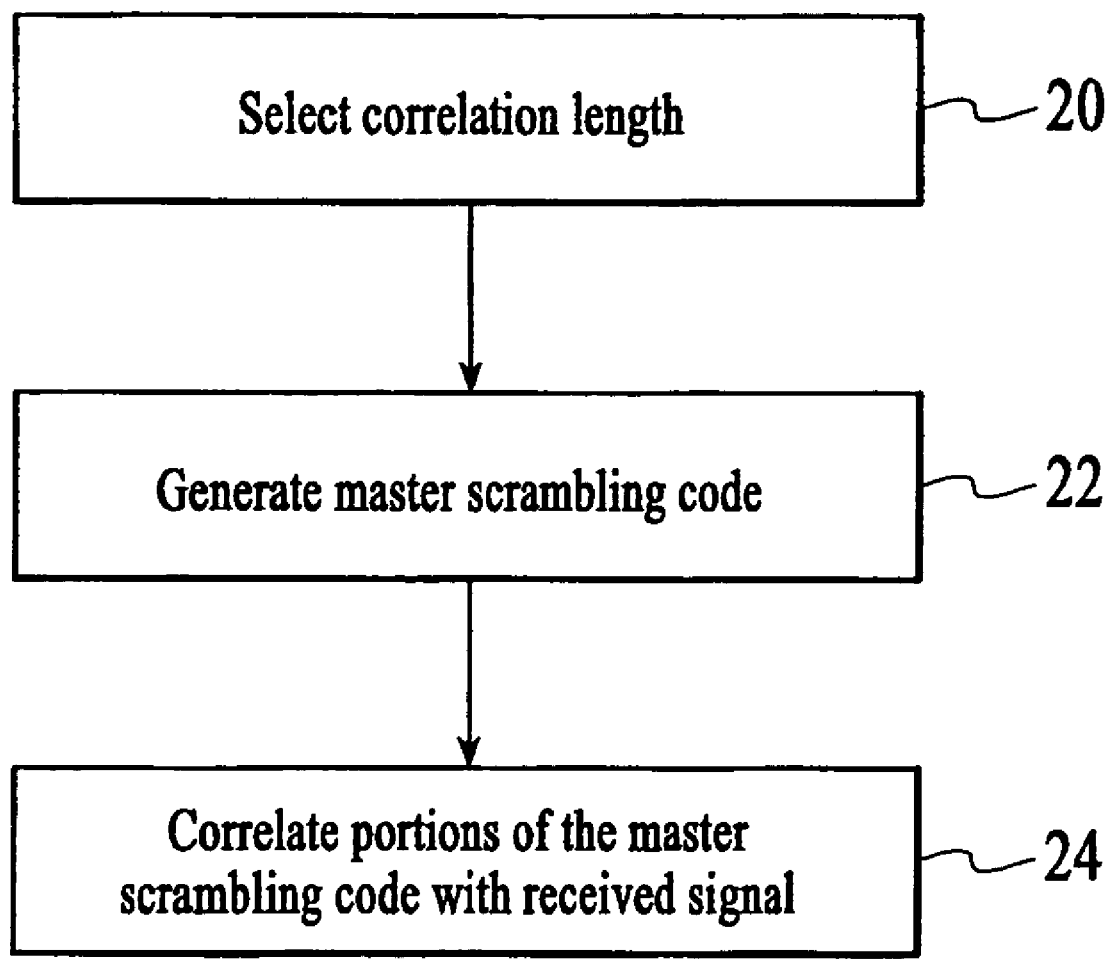
FIG. 2 is a flow diagram illustrating an exemplary method of the present invention.

FIG. 2 is a flow diagram illustrating an exemplary method of the present invention. Referring to FIG. 2, at 20, the correlation length N is first determined. The correlation length N is the amount of time during which correlation between the received signals and the generated scrambling codes is summed up. The correlation length N is selected such that reasonable correlation results can be obtained. A person of ordinary skill in the art will know how to select the proper correlation length. Next, at 22, using the selected correlation length, the chip offset (CO) between two adjacent scrambling codes, and the number of cells (C) within a group, a master scrambling code is generated. The master scrambling code has a period, e.g., 38,400 chips, which is sufficient to allow correlations to be performed reliably. N+CO*(C−1) corresponds to the amount of code needed to be generated to perform a correlation of length N with C cells spaced CO chips apart. It should be noted that the product term CO*C represents the chip offset between the respective scrambling codes of the first cells of two adjacent groups of base stations or cells. As mentioned above, during the first two steps of the initial cell search procedure, the start of the frame containing the scrambling code is identified and group identification information relating to the group which includes the cell that transmitted the received signals is available. With this information, the group which includes the cell that transmitted the received signals is identified. Moreover, using this information, the proper master scrambling code which covers all the possible scrambling codes from all the cells within the identified group can be generated. At 24, portions of the master scrambling code are used to create individual scrambling codes which correspond to the cells within the identified group. These individual scrambling codes are then correlated with the received signals in a parallel manner to determine which of the cells within the identified group transmitted the received signals.

The following is an example illustrating the exemplary method of the present invention. The example is based on the following assumptions: the correlation length N is two hundred and fifty-six (256); the chip offset CO is sixteen (16); and the number of cells C within the identified group is eight (8). The period of the master scrambling code is thirty-eight thousand and four hundred (38,400) chips.

Next, three hundred and sixty-eight (368) chips ($C_0 \rightarrow C_{367}$) of master scrambling code is generated from a single scrambling code generator tuned to the first primary cell of the underlying identified group. The length of three hundred and sixty-eight (368) chips is determined based on the formula N+CO*(C−1) which, in this case, equals to 256+16*(8−1)=256+16*7=256+112=368. It should be noted that it is not necessary to generate all three hundred and sixty-eight (368) chips prior to correlation. The generation of three hundred and sixty-eight (368) chips is specified to emphasize the total number of chips required out of the scrambling code generator to implement eight (8) parallel correlations of two hundred and fifty-six (256) chips each.

Figure 3:
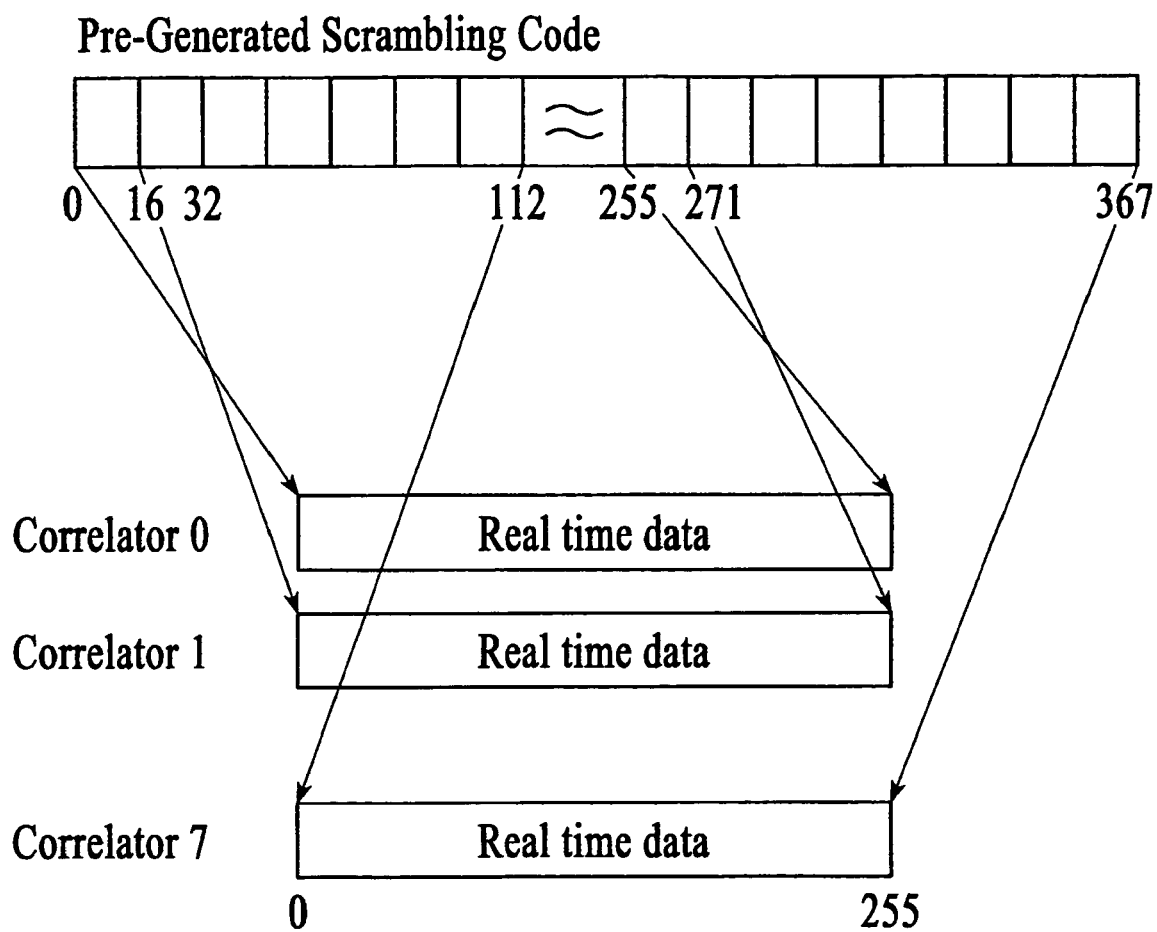
FIG. 3 is a simplified diagram illustrating parallel correlations of eight (8) cells in a group using a single scrambling code generator according to the present invention.

FIG. 3 is a simplified diagram illustrating parallel correlations of eight (8) cells in a group using a single scrambling code generator. As shown in FIG. 3, each of the eight (8) correlators correlates the received signals ($D_0 \rightarrow D_{255}$) with two hundred and fifty-six (256) chips of scrambling code, each starting at an offset of sixteen (16) chips. For example, the first correlator correlates the received signals ($D_0 \rightarrow D_{255}$) with the complex conjugate of ($C_0 \rightarrow C_{255}$); the second correlator correlates the received signals ($D_0 \rightarrow D_{255}$) with the complex conjugate of ($C_{16} \rightarrow C_{271}$); and so on, and the final correlator correlates the received signals ($D_0 \rightarrow D_{255}$) with the complex conjugate of ($C_{112} \rightarrow C_{367}$). The correlation results are then obtained from each of the correlators. By evaluating the correlation results, the scrambling code represented by the received signals can be identified and, hence, the identity of the base station or cell which transmitted the received signals can also be determined.

Figure 4:
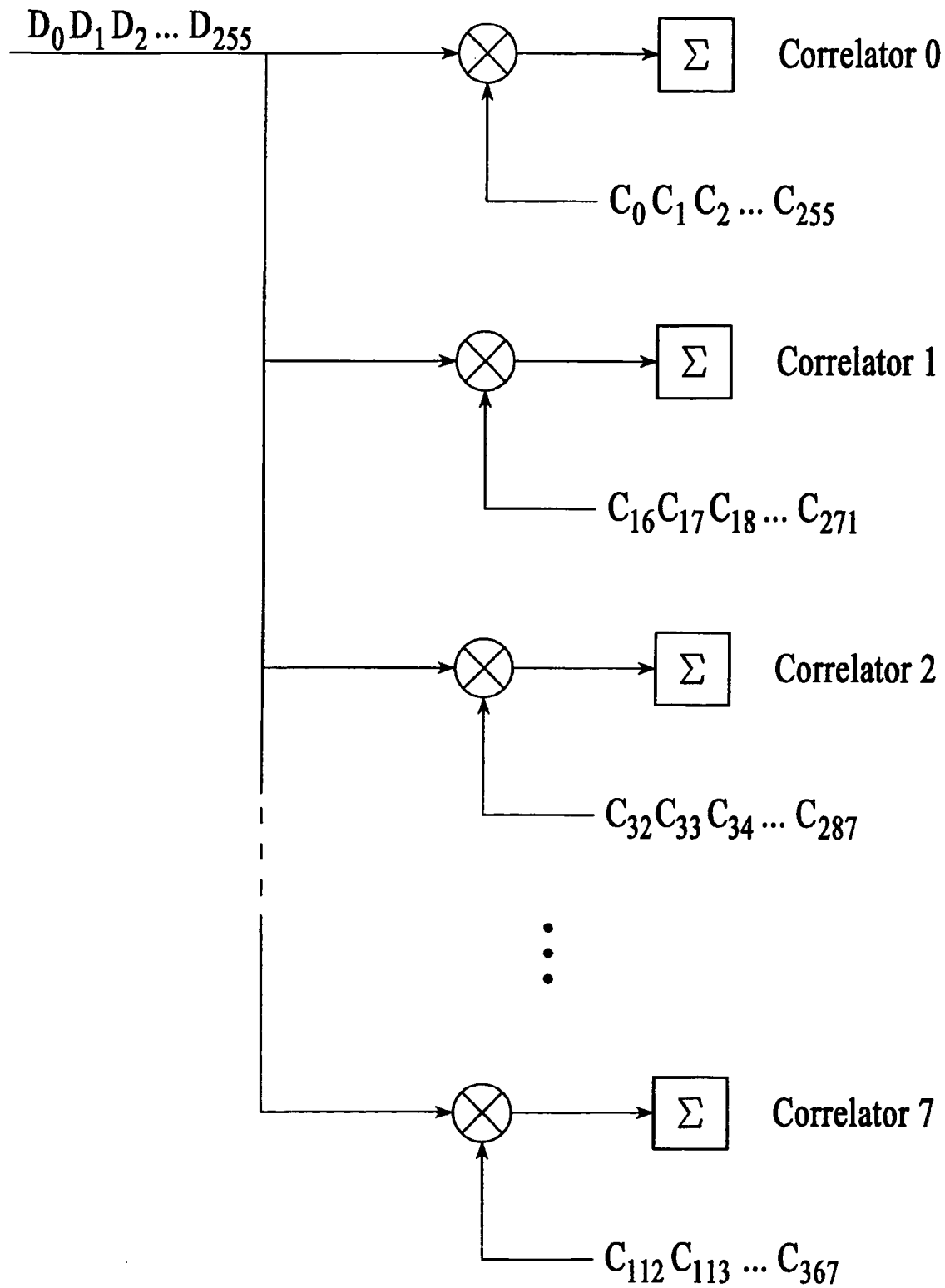
FIG. 4 is a simplified diagram illustrating an exemplary implementation of the exemplary method according to the present invention.

FIG. 4 is a simplified diagram illustrating an exemplary implementation of the exemplary method in accordance with the present invention. It is to be noted that the received signals are processed simultaneously in real-time by eight (8) parallel correlators. The scrambling code generator generate three hundred and sixty-eight (368), i.e., N+112 chips. This is in contrast to 8N chips that must be generated for the alternative approach in the parallel search implementation. Hence, there is a factor of 8N/(N+128) savings on the scrambling code generation complexity using the present invention, which equals to 5.3 for N=256 (an 82% reduction in complexity).

The exemplary method of the present invention as described may be implemented in software, hardware or a combination of both. For example, the exemplary method of the present invention may be implemented as control logic using software embedded in a mobile terminal. When implemented using software, the exemplary method may be implemented in a modular or integrated manner within the mobile terminal. Based on disclosure provided herein, a person of ordinary skill in the art will know of other ways and/or methods to implement the present invention.

Furthermore, it is understood that while the present invention as described above is applicable to a W-CDMA communication system, it should be clear to a person of ordinary skill in the art that the present invention can be applied to other types of communication systems.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for identifying a scrambling code from signals received from a base station, comprising:
   a scrambling code generator configured to generate a master scrambling code, wherein a period of the master scrambling code is a function of a correlation length and a number of cells C within a group of cells;
   control logic configured to generate a plurality of individual scrambling codes based on the master scrambling code, the plurality of individual scrambling codes being sequential and any two adjacent individual scrambling codes having a predetermined chip offset; and
   a plurality of correlators configured to perform correlations and generate correlation results, each correlator configured to correlate the received signals with a corresponding one of the plurality of individual scrambling codes and generate corresponding correlation results, the plurality of correlators performing their correlations in a parallel manner.

2. The system according to claim 1 wherein the correlation results generated by the plurality of correlators are evaluated to identify the scrambling code from the received signals thereby allowing the identity of the base station which transmitted the received signals to be identified.

3. The system according to claim 1 wherein the plurality of correlators perform their correlations in a real-time manner.

4. A mobile terminal incorporating the system as recited in claim 1.

5. The system according to claim 1 wherein the base station is located in a W-CDMA communication network.

6. A system for identifying a scrambling code from signals received from a base station, the base station belonging to one of a plurality of base station groups in a communication network, the system comprising:
   a scrambling code generator configured to generate a master scrambling codes wherein a period of the master scrambling code is a function of a correlation length and a number of cells C within a group of cells;
   control logic configured to generate a plurality of individual scrambling codes based on the master scrambling code, the plurality of individual scrambling codes being sequential and any two adjacent individual scrambling codes having a predetermined chip offset; and
   a plurality of correlators configured to perform correlations and generate correlation results, each correlator configured to correlate the received signals with a corresponding one of the plurality of individual scrambling codes and generate corresponding correlation results, the plurality of correlators performing their correlations in a parallel manner.

7. The system according to claim 6 wherein the master scrambling code has a period determined by a correlation length and a predetermined group chip offset.

8. The system according to claim 7 wherein the predetermined group chip offset is determined by number of base stations within a base station group and the predetermined chip offset.

9. The system according to claim 6 wherein the plurality of correlators perform their correlations in a real-time manner.

10. A mobile terminal incorporating the system as recited in claim 6.

11. The system according to claim 6 wherein the communication network is a W-CDMA communication network.

12. A method for identifying a scrambling code from signals received from a base station, comprising:
    generating a master scrambling code, wherein a period of the master scrambling code is a function of a correlation length and a number of cells C within a group of cells;
    generating a plurality of individual scrambling codes, wherein the plurality of individual scrambling codes are sequential and any two adjacent individual scrambling codes are separated by a predetermined chip offset; and
    correlating the received signals with each of the plurality of individual scrambling codes in a parallel manner and generating correlation results therefor.

13. The method of claim 12 further comprising:
    evaluating the correlation results to identify the scrambling code from the received signals thereby allowing the identity of the base station which transmitted the received signals to be identified.

14. The method of claim 12 wherein the base station belongs to one of a plurality of base station groups in a communication network and the step of generating the master scrambling code further comprises:
    selecting a correlation length; and
    generating the master scrambling code using the selected correlation length and a predetermined group chip offset.

15. The method of claim 14 wherein the predetermined group chip offset is determined by number of base stations within a base station group and the predetermined chip offset.

16. The method of claim 12 wherein the correlations are performed in a real-time manner.

17. A mobile terminal utilizing the method as recited in claim 12.

18. The method according to claim 12 wherein the base station is located in a W-CDMA communication network.

19. A system for identifying a scrambling code from signals received from a base station, comprising:
- means for generating a master scrambling code, wherein a period of the master scrambling code is a function of a correlation length and a number of cells C within a group of cells;
- means for generating a plurality of individual scrambling codes, wherein the plurality of individual scrambling codes are sequential and any two adjacent individual scrambling codes are separated by a predetermined chip offset; and
- means for correlating the received signals with each of the plurality of individual scrambling codes in a parallel manner and generating correlation results therefor.

20. The system according to claim 19 further comprising:
- means for evaluating the correlation results to identify the scrambling code from the received signals thereby allowing the identity of the base station which transmitted the received signals to be identified.

21. The system of claim 19 wherein the means for correlating performs its correlations in a real-time manner.

22. A mobile terminal utilizing the system as recited in claim 19.

23. The system according to claim 19 wherein the base station is located in a W-CDMA communication network.

24. The system according to claim 1 wherein the master scrambling code length is determined by the formula $N+CO*(C-1)$, wherein N is the correlation length, and CO is the chip offset.

* * * * *